(12) United States Patent
Elgebeely et al.

(10) Patent No.: US 10,248,535 B2
(45) Date of Patent: Apr. 2, 2019

(54) ON-DEMAND AUTOMATED LOCALE SEED GENERATION AND VERIFICATION

(71) Applicant: INTERNATIONAL BUSINESS MACHINES CORPORATION, Armonk, NY (US)

(72) Inventors: Aya R. A. Elgebeely, 6th of October (EG); Hisham E. Elshishiny, Cairo (EG); Su Liu, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/245,707

(22) Filed: Aug. 24, 2016

(65) Prior Publication Data

US 2018/0060207 A1 Mar. 1, 2018

(51) Int. Cl.
*G06F 9/44* (2018.01)
*G06F 11/36* (2006.01)

(52) U.S. Cl.
CPC ................ *G06F 11/3604* (2013.01)

(58) Field of Classification Search
CPC .................................................. G06F 11/3604
USPC ........................................................ 717/126
See application file for complete search history.

(56) References Cited

U.S. PATENT DOCUMENTS

| 6,453,462 B1 | 9/2002 | Meade et al. |
| 6,507,812 B1 | 1/2003 | Meade et al. |
| 7,310,659 B1 * | 12/2007 | George ................... G06F 9/546 709/206 |
| 2002/0184308 A1 * | 12/2002 | Levy ...................... G06F 3/1292 709/203 |
| 2005/0138146 A1 | 6/2005 | Rose et al. |
| 2010/0064178 A1 * | 3/2010 | Dhulipalla .......... G06F 11/3688 714/38.14 |
| 2013/0174136 A1 | 7/2013 | Atkin et al. |
| 2014/0089909 A1 | 3/2014 | Bromley, Jr. et al. |
| 2015/0007274 A1 * | 1/2015 | Chang ..................... G06F 21/62 726/4 |
| 2016/0328274 A1 * | 11/2016 | Deivanayagam ..... G06F 9/5083 |

FOREIGN PATENT DOCUMENTS

WO 2008012172 1/2008

* cited by examiner

*Primary Examiner* — Wei Y Zhen
*Assistant Examiner* — Lanny N Ung
(74) *Attorney, Agent, or Firm* — Tutunjian & Bitetto, P.C.; Scott Dobson

(57) ABSTRACT

Methods and systems for locale verification include converting a set of expected locale responses into a normalized format based on a locale data template. A user's filled locale data template in the normalized format is compared to the normalized set of expected locale responses using a processor. A report is generated that identifies mismatches between the received locale data template and the set of expected locale responses.

20 Claims, 5 Drawing Sheets

ON-DEMAND AUTOMATED LOCALE SEED GENERATION AND VERIFICATION

BACKGROUND

Technical Field

The present invention generally relates to globalization verification testing and, more particularly, automatically enabling and verifying localization.

Description of the Related Art

Globalization verification testing (GVT) is implemented during the functional verification testing (FVT) phase of development. The goal of GVT is to identify functional defects related to international operation. The globalization verification test ensures that the product can run in an international environment after translation. It would be very difficult to verify all language versions of all operating systems, so it is not practical to run a full test of a product in all environments. GVT therefore incorporates the use of specialized tools to verify functions in different environments.

One part of GVT is a locale enablement verification test. This stage assesses the locale awareness of a system under test. The enablement of new locales in a system can involve a substantial amount of effort in planning, design, and verification. Verification is generally performed after the locales are built and added to the system. This puts overhead on the testing phase to identify all errors relating to previous development phases that remained in the testing phase.

Conventional locale object verification is conducted by converting locale data using custom tools from globalization libraries to machine-friendly locale seed files which locale compiler can read, parse, and compile. Those files, along with configuration files (such as Makefiles), are included and compiled in the build of new system releases. After the new release of the system, the testing team runs the locale verification test to verify the updated locale objects. If defects are detected, the development team tries to find the root cause of the defects and fix them. The system is then rebuilt and the cycle is repeated until all defects are fixed and the system is released. This manual procedure has a high human resource cost and exposes the system source code to the third party testing company.

SUMMARY

A method for locale verification includes converting a set of expected locale responses into a normalized format based on a locale data template. A user's filled locale data template in the normalized format is compared to the normalized set of expected locale responses using a processor. A report is generated that identifies mismatches between the received locale data template and the set of expected locale A system for locale verification includes a comparing module having a processor configured to convert a set of expected locale responses into a normalized format based on a locale data template and to compare a user's filled locale data template in the normalized format to the normalized set of expected locale responses using a processor. A report module is configured to generate a report that identifies mismatches between the received locale data template and the set of expected locale responses.

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein.

DETAILED DESCRIPTION

Embodiments of the present invention provide on-demand, automatic locale seed file verification. Locale verification is performed prior to building and testing a system. Verification can be performed on any level of the system, whether in the interface, middleware software, or operating system, and may be performed independently from the locale type, versions of locale methods and interfaces, and unified character codeset.

The present embodiments verify testing results against standard raw locale definition data (such as the Unicode Common Locale Data Repository (CLDR), a widely used industry locale standard, or any other appropriate industry or national standard). The present embodiments accomplish this verification by converting user requested locale seed file data and system generated reference data to character set code points and comparing the code points, preventing any data loss that might arise from reading and rendering text files on different platforms.

It is to be understood in advance that, although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Figure 1:
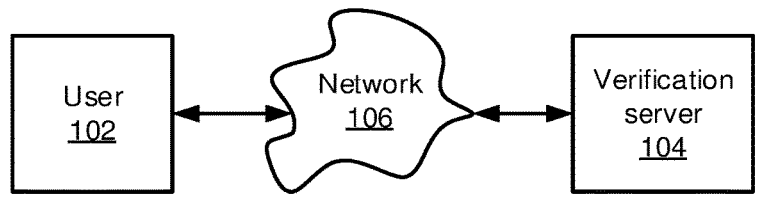
FIG. 1 is a block diagram of an automated locale seed generation and verification system in accordance with the present principles.

Referring now to FIG. 1, a locale verification system is shown. A user 102 interacts with a remote verification server 104 through a network 106. The user 102 may represent any time of developer, engineer, or designer running a system under development. The user 102 seeks to verify that the locale configuration for the system under development and so communicates with the remote verification server 104. The remote verification server 104 receives configuration information from the user 102 and provides testing tools back to the user. The user 102 applies the testing tools (for example, a locale data template and a conversion tool), applies those tools to the system under development, and sends the results back to the verification server 104. The verification server 104 compares the results to reference data generated by known-good libraries and reports back to the user 102 any discrepancies.

It should be noted that network 106 is intended to be a general and non-limiting form of communication between the user 102 and the verification server 104. The network 106 may represent any wired or wireless form of communication, including local area networks, wide area networks, cellular networks, and direct point-to-point communications. The verification server 104 may be located locally to the user 102 (and, in one embodiment, may be performed by the same physical device as the system under development) or may, alternatively, be located remotely. In one particular embodiment, the verification server 104 may be implemented in a distributed fashion in a cloud computing environment.

Figure 2:
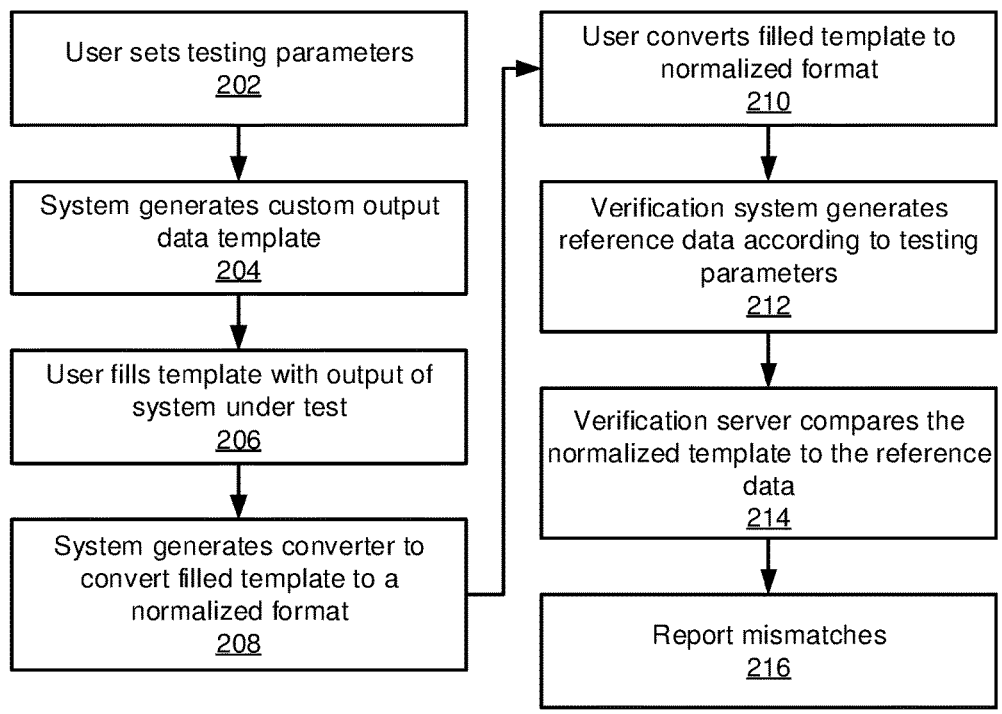
FIG. 2 is a block/flow diagram of a method for automated locale seed generation and verification in accordance with the present principles.

Referring now to FIG. 2, a method of locale verification is shown. In block 202, a user 102 sets testing parameters for an application or system being tested. These parameters may include, for example, a character encoding and its version (e.g., Unicode, ASCII, ISO-8859-1, etc), a globalization library name and release (e.g., CLDR), a platform supporting the system under test (e.g., the operating system), and a set of desired locale-related attributes to be included in testing (e.g., date/time formats, number/currency formats, measurement units, collation, names for language, territories, scripts, time zones, or currencies, language/locale matching, etc.).

The verification server 104 generates a custom output data template based on the parameters entered by the user 102 in block 204. This template includes fields for expected types of information. In one example, a date format template may include entries for long, medium, and short forms of date displays. In another example, a template may include entries for two different versions of an output—for example providing English and Japanese equivalents.

The user 102 fills out the template in block 206, providing the exact output of the system under test for each entry in the data template. Following the example of a date format template, the filled template may look like Table 1 below. In this example, the date has been rendered in a variety of different ways to test whether the system correctly displays the date in different contexts.

TABLE 1

| Full | Thursday, October 14, 2010 |
| Long | October 14, 2010 |
| Medium | Oct 14, 2010 |
| Short | 10/14/10 |

The verification server 104 also generates a converter for the user 102 in block 208. The converter converts the filled data template into a normalized format (e.g. a normalized locale seed file) for transmission and later analysis. In one specific embodiment, it is contemplated that the converter converts the output character from a multi-byte character into a hexadecimal code point for the respective encoding. Each character in a character set has a respective code point for that character set. In one particular example, the Chinese character, '一' has a code point in Unicode of 4E00. Similarly, the Latin capital letter 'A' has a code point in Unicode of 0041. Converting the user's output to explicit codepoints prevents the data from being translated through transmission which may, for example, attempt to re-encode text to another character set or may otherwise corrupt the information. The user 104 employs the converter in block 210 to convert the filled data template to a normalized format.

The converter may include a codeset converter and a character name converter. Both of converters can be used for detecting and converting a character value in a certain codeset and/or a character name in an unified character set standard (e.g. Unicode). A character name lookup table can be used by the converter to find the related code point that replaces the target character.

The verification server 104 generates reference data according to the testing parameters and fills out the same data template as the user in block 212. Although shown as occurring after the user fills out the data template in block 206 and converts the template into normalized form in block 210, generation of the reference data may occur before, during, between, or after those steps. Block 212 also normalizes the reference data template using the same converter as was sent to the user to ensure that the data is in a comparable format. Generation of the reference data is performed using globalization libraries. In one specific example, such libraries may include libc.a, libiconv.a, libi18n.a, and libim.a.

The reference data and the user's normalized data template are both converted to the same format based on the user's testing parameters by the converter. Each section of the respective data sets describes one of the testing parameters, where an example may look like the following:

<locale type="te_TR">
<encoding type="UTF-8">
<language name="Turkish">
<currency value="Turkish lira sign">20BA</currency>
<yesstr value="evet">65 76 65 74</yesstr>
<nostr value="hayir">68 61 79 131 72</nostr>

In this example, 20BA is the Unicode codepoint for the Turkish Lira character. The <yesstr> tag and <nostr> tag are standard "YES" and "NO" definition variables in CLDR that represent the yes and no strings for locale related messages. By using these variables, software developers do not need to hardcode "yes" and "no" in a program. The numbers in the <yesstr> and <nostr> tags are corresponding Unicode code points for Yes and No strings in Turkish characters. For example, the code point value of 'e' is 0065 in Unicode.

At block 214, the verification server 104 compares the normalized data template from the user 102 to the reference data. In particular, the verification server 104 performs a character-by-character comparison of the code points for the two data sets, with any discrepancies between the two being flagged. Such mismatches represent a failure of the system under test to provide the correct output for the testing parameters set by the user. Thus, discrepancies represent a failure of the system under test to conform to the particular locale of interest.

Block 216 builds a report of any mismatches from the user's normalized data template. In some embodiments, the report may include specific information on where the system under test failed and in what manner. In some embodiments, the report may include advice as to how the user 102 might correct the problem. In other embodiments, where the verification server 104 is more closely integrated with the user 102, the report may directly control parameters of the system under test to correct errors.

Early detection and correction of locale defects saves time, money, and consumer goodwill. Early intervention is especially helpful if the problem is architectural or endemic, allowing the user 102 sufficient time to make corrections. Thus, the present embodiments may be employed to verify locale implementations at any stage of development. In addition, the present embodiments may be used to determine the expected outcome before development even starts. The user 102 selects the parameters in advance and the verification server 104 returns the expected output as per the selected globalization features. This provides insight to the user 102 as to how to provide globalization requirements in the requirements analysis phase and eases unit test cases.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 3:
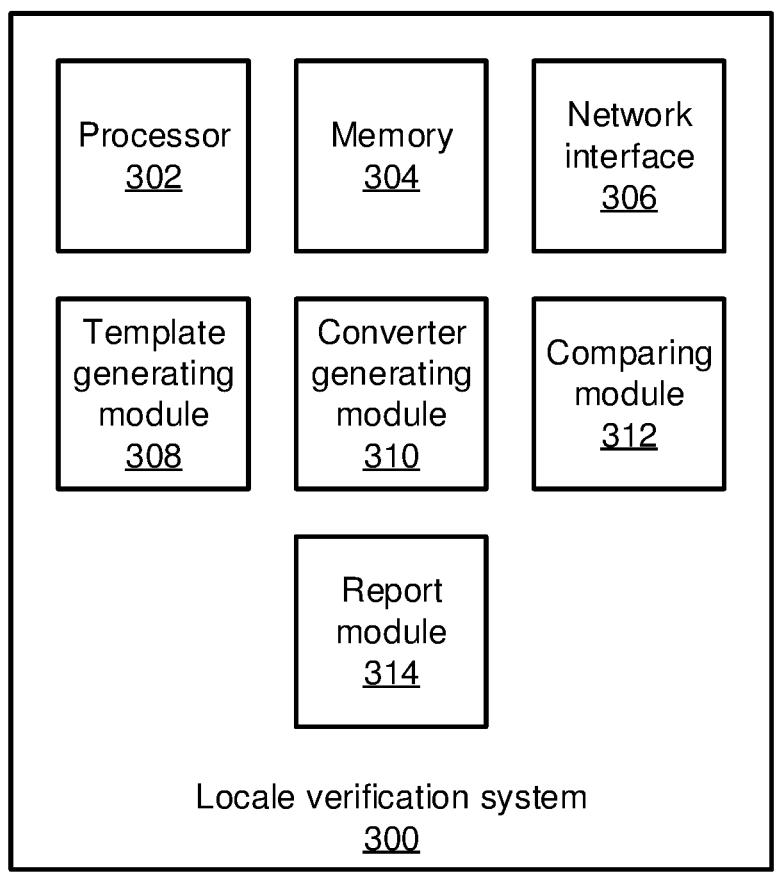
FIG. 3 is a block diagram of a locale verification system in accordance with the present principles.

Referring now to FIG. 3, a locale verification system 300 is shown. The system 300 may be a part of the verification server 104 and includes a hardware processor 302 and memory 304. The system 300 further includes a network interface 306 that allows the locale verification system 300 to communicate with user 102 via network 106. The system 300 furthermore includes one or more functional modules. In one embodiment, the functional modules may be implemented as software that is stored in the memory 304 and executed by processor 302. In an alternative embodiment, the functional modules may be implemented as one or more discrete hardware components in the form of, e.g., application specific integrated chips or field programmable gate arrays.

The template generating module 308 creates a locale data template based on the parameters provided by the user 102. This template is transmitted to the user 102 via the network interface 106. A converter generating module furthermore creates a converter configured to transform the locale data template with the user's entered locale information into a normalized format by, e.g., converting each character to its corresponding code point. After the user 102 enters locale data into the locale data template and uses the converter to transform the filled template into the normalized format, the network interface 306 receives the normalized template from the user. It is specifically contemplated that the converter is an executable piece of software that can convert data from one encoding to another.

A comparing module 312 meanwhile uses the template generated by the template module 308 and a set of standard libraries to generate expected locale information. This expected locale information is converted using the converter to the same normalized format as is sent by the user 102. The comparing module 312 then compares the normalized template from the user 102 and the normalized expected locale information to identify any mismatches. Block 314 then generates a report that identifies the mismatches, which represent failures of the user's system to generate the expected locale data.

Figure 4:
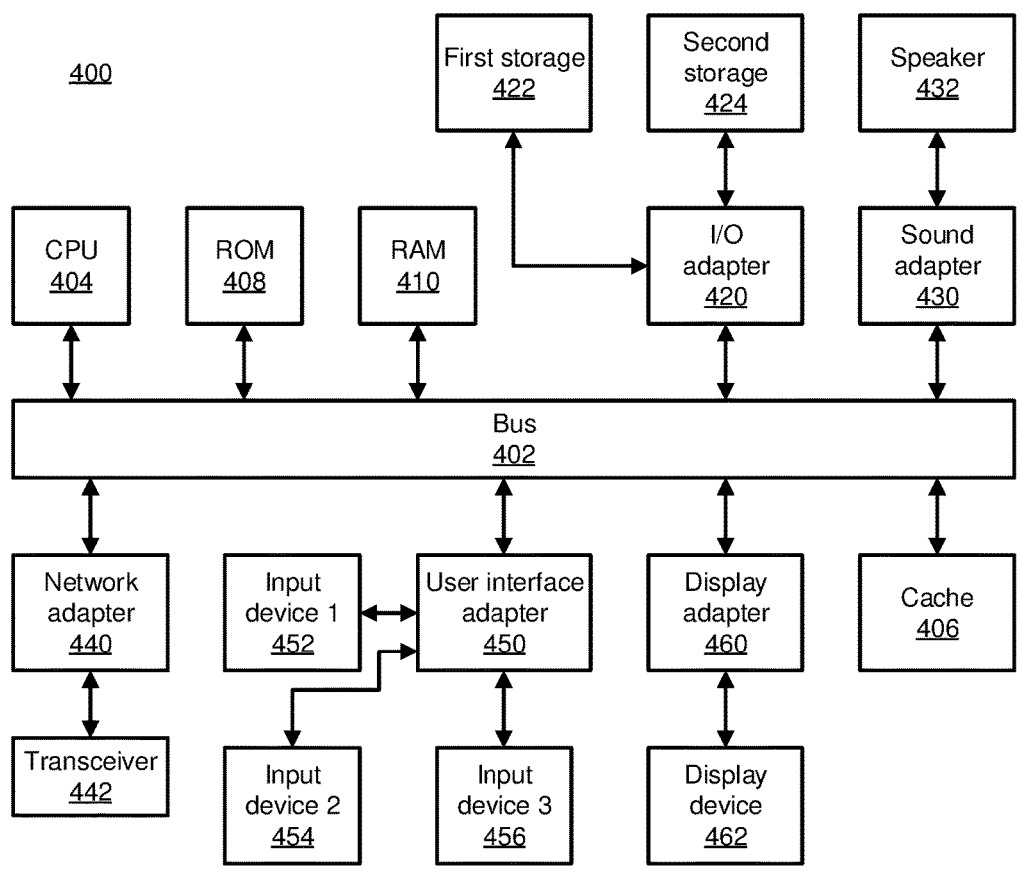
FIG. 4 is a block diagram of a processing system in accordance with the present principles.

Referring now to FIG. 4, an exemplary processing system 400 is shown which may represent the locale verification system 300. The processing system 400 includes at least one processor (CPU) 404 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 452, 454, and 456 can be the same type of user input device or different types of user input devices. The user input devices 452, 454, and 456 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present principles provided herein.

Figure 5:
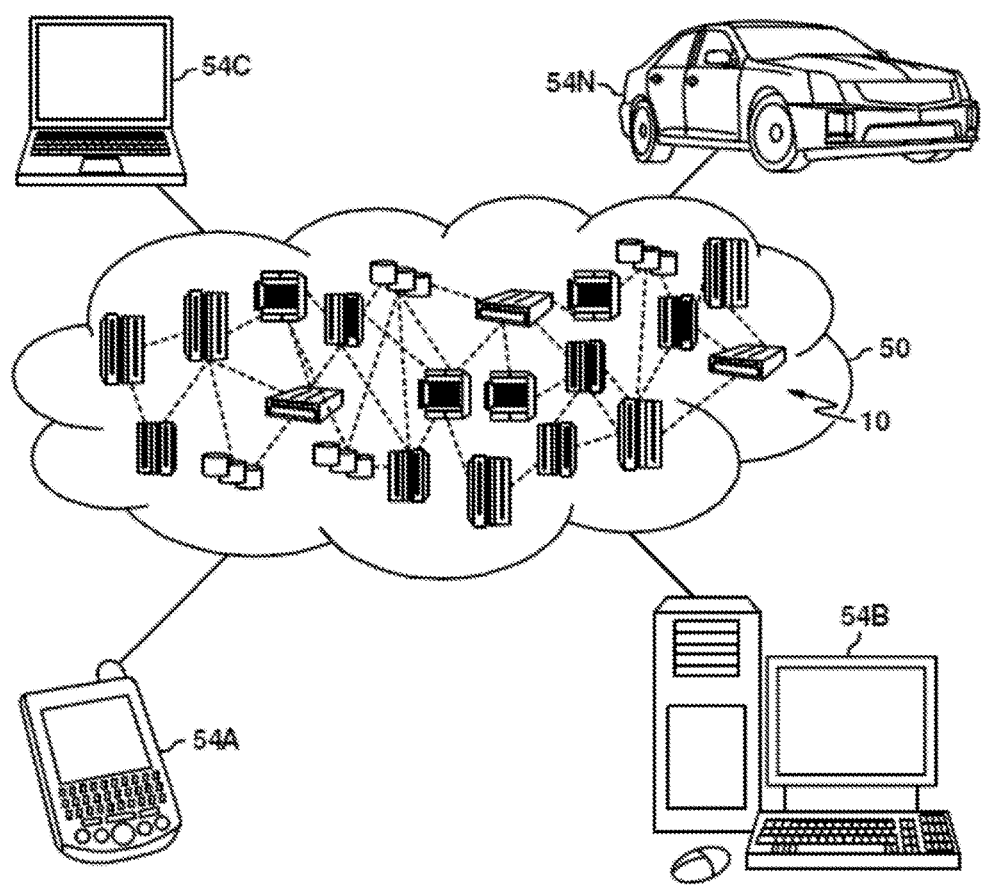
FIG. 5 is a diagram of a cloud computing environment according to the present principles.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
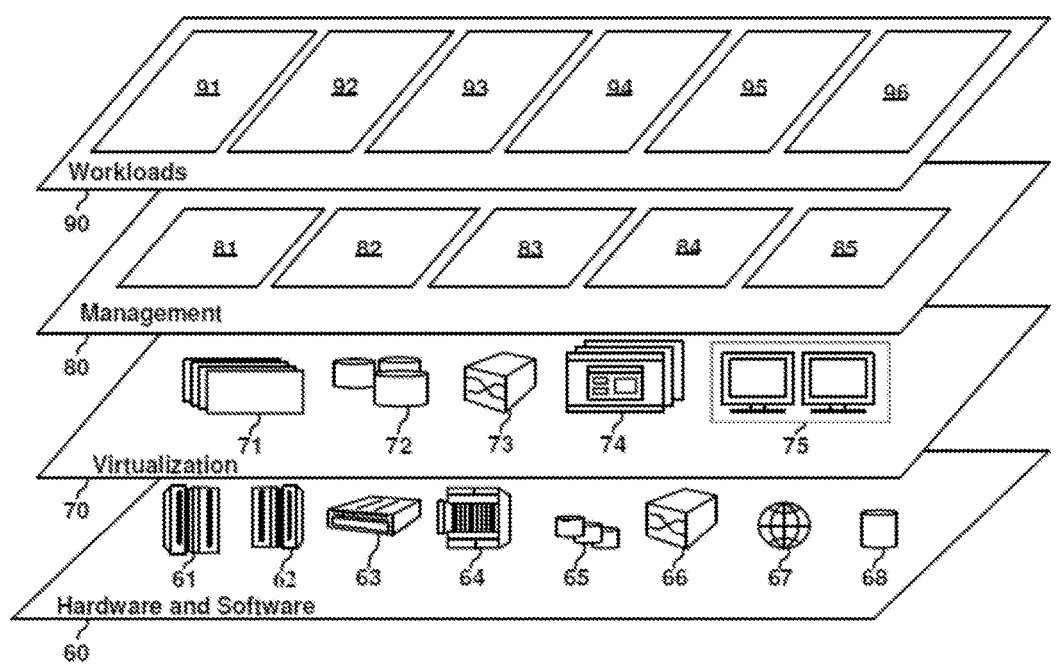
FIG. 6 is a diagram of abstraction model layers according to the present principles.

Referring now to FIG. 6, a set of functional abstraction layers provided by cloud computing environment 50 (FIG. 5) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and locale verification 96.

Having described preferred embodiments of on-demand automated locale generation and verification (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for locale verification, comprising:
   receiving a user's locale information to fill a locale data template at a user device;
   converting the user's filled locale data template to a normalized format to prevent data loss across platforms;
   converting a set of expected locale responses into the normalized format based on the locale data template;
   comparing the user's normalized filled locale data template to the notinalized set of expected locale responses to identify one or more mismatches between the received locale data template and the set of expected locale responses, pertaining to at least one locale-related attribute of the system under test, using a processor; and
   automatically altering the at least one locale-related attribute of the system under test to correct the one or more mismatches.

2. The method of claim 1, further comprising generating the locale data template in accordance with a set of locale parameters.

3. The method of claim 2, wherein the locale parameters are set by a user with respect to a system under test.

4. The method of claim 2, further comprising generating the set of expected locale responses in accordance with the set of locale parameters using a globalization library selected from the group consisting of libc.a, libiconv.a, libi18n.a, and libim.a.

5. The method of claim 2, further comprising generating a converter configured to convert a user's filled locale data template into the normalized format.

6. The method of claim 5, wherein the converter is configured to transform each character in the user's filled locale data template into a corresponding code point.

7. The method of claim 5, further comprising transmitting an empty locale data template and the converter to a user.

8. The method of claim 7, further comprising receiving the user's filled locale data template from the user prior to said comparing.

9. The method of claim 1, wherein converting comprises transforming each character in the set of expected locale responses into a corresponding code point.

10. The method of claim 1, wherein converting the set of expected locale responses, comparing, and generating are performed in the remote testing device which is part of a cloud computing service.

11. A computer program product for locale verification, the computer program product comprising a computer readable storage medium having program instructions embodied therewith, the program instructions readable by a computer to cause the computer to:
   receiving a user's locale information to fill a locale data template at a user device;
   converting the user's filled locale data template to a normalized format to prevent data loss across platforms;
   converting a set of expected locale responses into the normalized format based on the locale data template;
   comparing the user's normalized filled locale data template to the normalized set of expected locale responses to identify one or more mismatches between the received locale data template and the set of expected locale responses, pertaining to at least one locale-related attribute of the system under test, using a processor; and
   automatically altering the at least one locale-related attribute of the system under test to correct the one or more mismatches.

12. A system for locale verification, comprising:
a network interface configured to receive a locale data template from a user device that has been filled by a user with locale information, said filled locale data template being in a normalized format to prevent data loss across platforms;
a comparing module comprising a processor configured to convert a set of expected locale responses into the normalized format based on a locale data template and to compare the user's normalized filled locale data template to the normalized set of expected locale responses to identify one or more mismatches between the received locale data template and the set of expected locale responses, pertaining to at least one locale-related attribute of the system under test; and
a report module configured to automatically alter the at least one locale-related attribute of the system under test to correct mismatches between the received locale data template and the set of expected locale responses.

13. The system of claim 12, further comprising a template generating module configured to generate the locale data template in accordance with a set of locale parameters.

14. The system of claim 13, wherein the locale parameters are set by a user with respect to a system under test.

15. The system of claim 13, wherein the comparing module is further configured to generate the set of expected locale responses in accordance with the set of locale parameters using a globalization library selected from the group consisting of libc.a, libiconv.a, libi18n.a, and libim.a.

16. The system of claim 13, further comprising a converter generating module configured to generate a converter configured to convert a user's filled locale data template into the normalized format.

17. The system of claim 16, wherein the converter is configured to transform each character in the user's filled locale data template into a corresponding code point.

18. The system of claim 16, wherein the network interface is further configured to transmit an empty locale data template and the converter to a user.

19. The system of claim 18, wherein the network interface is further configured to receive the user's filled locale data template from the user prior to said comparing.

20. The system of claim 12, wherein the comparing module is further configured to transforming each character in the set of expected locale responses into a corresponding code point.

* * * * *